United States Patent
Gonzalez Sáinz et al.

(10) Patent No.: US 8,347,470 B2
(45) Date of Patent: Jan. 8, 2013

(54) PORTABLE ROBOT

(75) Inventors: Javier Gonzalez Sáinz, Cádiz (ES); Juan Ramón Astorga Ramírez, Cádiz (ES); Agustin J. Sáenz Fernández, San Sebastián (ES); Valentin Collado Jiménez, San Sebastián (ES)

(73) Assignee: Airbus Operations, S.L., Getafe (Madrid) (ES)

( * ) Notice: Subject to any disclaimer, the term of this patent is extended or adjusted under 35 U.S.C. 154(b) by 1312 days.

(21) Appl. No.: 12/073,518

(22) Filed: Mar. 6, 2008

(65) Prior Publication Data

US 2009/0000800 A1  Jan. 1, 2009

(30) Foreign Application Priority Data

Jun. 27, 2007  (ES) .................................. 200701801

(51) Int. Cl.
*B23P 23/00* (2006.01)
*B23B 39/00* (2006.01)
*B23Q 3/157* (2006.01)

(52) U.S. Cl. ............. 29/34 B; 29/26 B; 483/31; 408/76; 408/88; 408/95; 408/97; 408/103; 409/178

(58) Field of Classification Search .................. 29/34 B, 29/26 B, 525.06, 525.05, 26 A, 26 R; 408/88, 408/76, 77–78, 95, 97, 103, 67, 56; 409/178–179, 409/136, 135, 137; 483/31
See application file for complete search history.

(56) References Cited

U.S. PATENT DOCUMENTS

| 4,523,100 | A | | 6/1985 | Payne |
| 5,533,845 | A | * | 7/1996 | Glover ........................ 409/178 |
| 5,836,068 | A | * | 11/1998 | Bullen et al. .................. 29/34 B |
| 5,896,637 | A | * | 4/1999 | Sarh .............................. 29/34 B |
| 6,382,889 | B1 | | 5/2002 | Brown et al. |
| 6,855,099 | B2 | * | 2/2005 | Hazlehurst et al. ........... 29/34 B |

FOREIGN PATENT DOCUMENTS

EP  1 792 673 A  6/2007
JP  11221707  8/1999

OTHER PUBLICATIONS

European Search Report issued Jul. 22, 2008 in the counterpart European Application No. EP 08380073.

* cited by examiner

*Primary Examiner* — Erica E Cadugan
(74) *Attorney, Agent, or Firm* — Wenderoth, Lind & Ponack, L.L.P.

(57) ABSTRACT

Portable robot for carrying out the drilling process in the assembly of aeronautical components which are secured on a support known as a stand. The robot comprises a displaceable platform in order to permit it to be located close to the stand, and an arm, which supports a frame comprising a beam intended to support a drilling head that can be displaced in the three axes.

21 Claims, 5 Drawing Sheets

PORTABLE ROBOT

OBJECT OF THE INVENTION

The portable robot of the invention is intended to carry out the drilling process undertaken during the fitting or assembly of aeronautical components, for which these components are fitted by means of precision tools on a support conventionally known as a stand; and which has the object of allowing the robot to displace itself to the place where the stand is to be found, on which it is fixed in order to produce the different drill-holes.

Another object of the invention is to allow the robot to be able to advance automatically along those stands, securing itself in different positions provided therein in order to produce all the drill-holes for the piece to fit.

In particular, the invention is applicable to the drilling carried out in the assembly of large aeronautical structures such as wing spars, stabilisers and control surfaces, but it can obviously be used in the assembly of any of the pieces of an aircraft. The invention is furthermore applicable to different models of stand in existence.

PRIOR ART OF THE INVENTION

In the assembly of large aeronautical structures, such as spars, supports known as stands are used in which the spars are fixed by means of fastening tools and supports and via the different drill-holes previously made in the piece itself. Once the piece has been mounted on the stand, a drilling stage is then performed which is generally done manually. For this, a large number of costly jigs are used for the precision positioning of the manual or semi-automatic tools used by operators for carrying out the drilling.

The manual processes are deficient in terms of productivity and overall process cost, and so automation processes are gradually being introduced for carrying out the drilling in such a way that the drilling times are reduced. It can be pointed out that this process of the assembly process lasts a long time since each product typically has thousands of holes, which means that total savings in production time can be notable.

The automation systems that are being introduced consists of large multi-axial machines fixed to the floor of the plant on a specially constructed foundation. The investments required for these machines are generally fairly high and they are present a series of operational limitations.

This type of machinery requires a large amount of permanent floor space and it also requires the product to be processed, along with its tool, to be brought to the work zone of the machine. In addition to this drawback, its size and large work volumes makes it difficult for this type of machine to maintain narrow positioning tolerances throughout its entire range of movement in all its axes, since it has to perform thousands of drill-holes from its fixed location, in which the holes at one end are separated from those at the other end by very considerable distances. The need therefore arises to reference and calibrate the machine to the piece several times during the work process, which has a significant negative impact on the total efficiency and on the cost of the process.

Moreover, the piece has to be brought to the machine, which implies that the process involves non-productive transition times. On the other hand, in other to provide some flexibility for the production plants so that the piece to be assembled can be modified on account of design changes in the aircraft, the production means need to be easily moveable and relocatable in the plant or, better yet, they ought not to occupy it permanently.

As a consequence, considering the progressive increase in aeronautical structural components that is being witnessed in recent times, it seems evident that traditional fixed machinery is destined to become less and less suitable owing to the fact that the large dimensions of these components have a direct influence both on the performance of the machine and on the cost of the system.

For this reason, the invention has developed a new automated drilling robot that is portable and of small dimensions. As a result of this portability of the robot, the piece can remain in a fixed location and does not require any specific or permanent foundation for the machine in the production plant.

Moreover, the inventive robot does away with a large part of the referencing and adjustment times of the machine to the product, for which it provides the portable system with the capacity for fixing itself to the assembly stand of it. Also, the inventive robot improves productivity since it is capable of carrying out all the work on the same product automatically without any intervention from the operator, in such a way that it moves under its own means over the whole of the stand in order to traverse the different work zones until it covers the entire extent of the product.

Furthermore, by means of the inventive robot, the training of the operators becomes simpler, and it also requires much less configuration than conventional machines, which means that its starting cost is much less. The invention also permits itself to be adjusted to different sets of stands and facilitates its use in the production plant, with which the dead times of this system are far fewer than those of the conventional version. All this leads to the amortisation of the robot in much shorter time spans.

In addition, the design of the inventive robot means that, even though pieces are becoming larger and larger in length, this does not affect the structure of the robot or its performance, since this merely means that it has to carry out a larger number of advance steps over the product in order to cover it in its entirety.

With the aim of increasing the production ratios, the invention permits the use of a variable number of portable robots working on the assembly of the same piece in order to cut down on production times.

DESCRIPTION OF THE INVENTION

As it has been described, the portable robot of the invention is intended to carry out the drilling process in the assembly process of aeronautical components which, by means of precision tools, are secured on a support known as a stand; and which is characterised in that it comprises a displaceable platform in order to permit it to be located close to the stand, and in which an arm is included which supports a frame comprising a beam intended to support a drilling head that can be displaced in the three axes. It also comprises means of securing the frame to the stand in at least one position required in said stand, from which the displacement of the head along the three axes is governed by means of numerical control in order to carry out the drillings previously established in the numerical control. Consequently, this structure permits the frame to be secured to the stand and from this point the functioning of the head in the three axes is governed. This means that the robot can only produce drill-holes in the zone where it is secured to the frame, in such a way that the latter is referenced with a small margin of error with respect to the stand, allowing it to create all the drill-holes with a positioning precision that lies within the margins set by the positioning tolerance. Therefore, there is no need for recalibration with respect to the spar, or for repositioning of the tool once the frame has been fixed to the assembly stand, since the numerical control knows precisely the position of the drill-hole with respect to the piece to drill, thanks to the precise mounting of the piece on the stand and the precise securing the frame on that stand.

The invention makes provision so that it can consist of a series of securing positions for the frame to the stand, in order to thereby carry out the drilling process on the whole of the aeronautical piece, independently of the length which the latter might have, and at all times staying within the established tolerance margins due to knowing each of the positions of the stand to which the frame is secured. To achieve this, means of crawling have been provided for the frame and beam over the stand in order to permit its position to be changed on the stand and different drillings to be performed from each of the different positions in which the frame is secured to the stand.

The means of crawling include a base of the beam via which the beam is secured to the frame with the possibility of longitudinal displacement, in such a way that the beam can move along the frame. Moreover, the beam is also provided with means of securing to the stand which are kept deactivated in order to permit displacement of the beam along the frame and consequently permit displacement of the drilling head along the X axis, since this is secured to the beam as commented upon earlier. Once the head has finished carrying out all the drill-holes, the beam together with the head are displaced towards one end of the frame, at which point the means of securing the beam to the stand are actuated in order to secure the former to the latter and the securing the frame to the stand is deactivated. The entire array remains supported by the means of securing the beam to the stand and with the aid of the arm, since the latter supports the weight of the frame and beam, all of which is provided for on account of the fact that the means of securing for the beam to the stand are not sufficient for supporting the weight of the unit comprising the frame and beam.

In this situation, the frame is allowed to displace towards the next position of the stand incorporating means of securing the frame to the stand, in which position it is secured and the process described above is repeated.

Referring to the means of securing the frame to the stand, these consist of some projecting nuts in which fit certain bolts provided in the stand, these bolts being fastened by means of a servo-pneumatic circuit governed by a PLC (programmable logic circuit).

With regard to the means of securing the beam to the stand, these consist of electromagnetic suction pads actuated by cylinders so that, when the securing the beam to the stand is carried out and the means of securing the frame to the stand are deactivated, the frame can be separated by a sufficient distance so that the projecting nuts can be released with respect to the bolts and thus permit displacement of the frame to the following securing position.

It comprises some cross-carriages in which the drilling head is supported and which are located on the beam in order to permit displacement of the head in the Y and Z axes. These cross-carriages are conventional of the type driven by ball spindles and servomotors, with guides of runners and rails, commercially available.

The invention provides for the arm to be able to be displaced in any direction in order to permit the projecting nuts to be positioned facing the bolts.

The displaceable platform is moved by means of manual or automatic means of displacement of the conventional type, and is supported on wheels.

Furthermore, the displaceable platform is provided with devices that are conventionally used in these applications such as an electrical cabinet containing the numerical control, device for suction and collection of the swarf generated by the drillings, cooler for the head, and the hydraulic unit for change of tool.

Below, in order to facilitate a better understanding of this specification and forming an integral part thereof, a series of figures are attached in which, on an illustrative rather than limiting basis, the most characteristic details of the inventive object have been represented.

DESCRIPTION OF THE PREFERRED FORM OF EMBODIMENT

Figure 1:
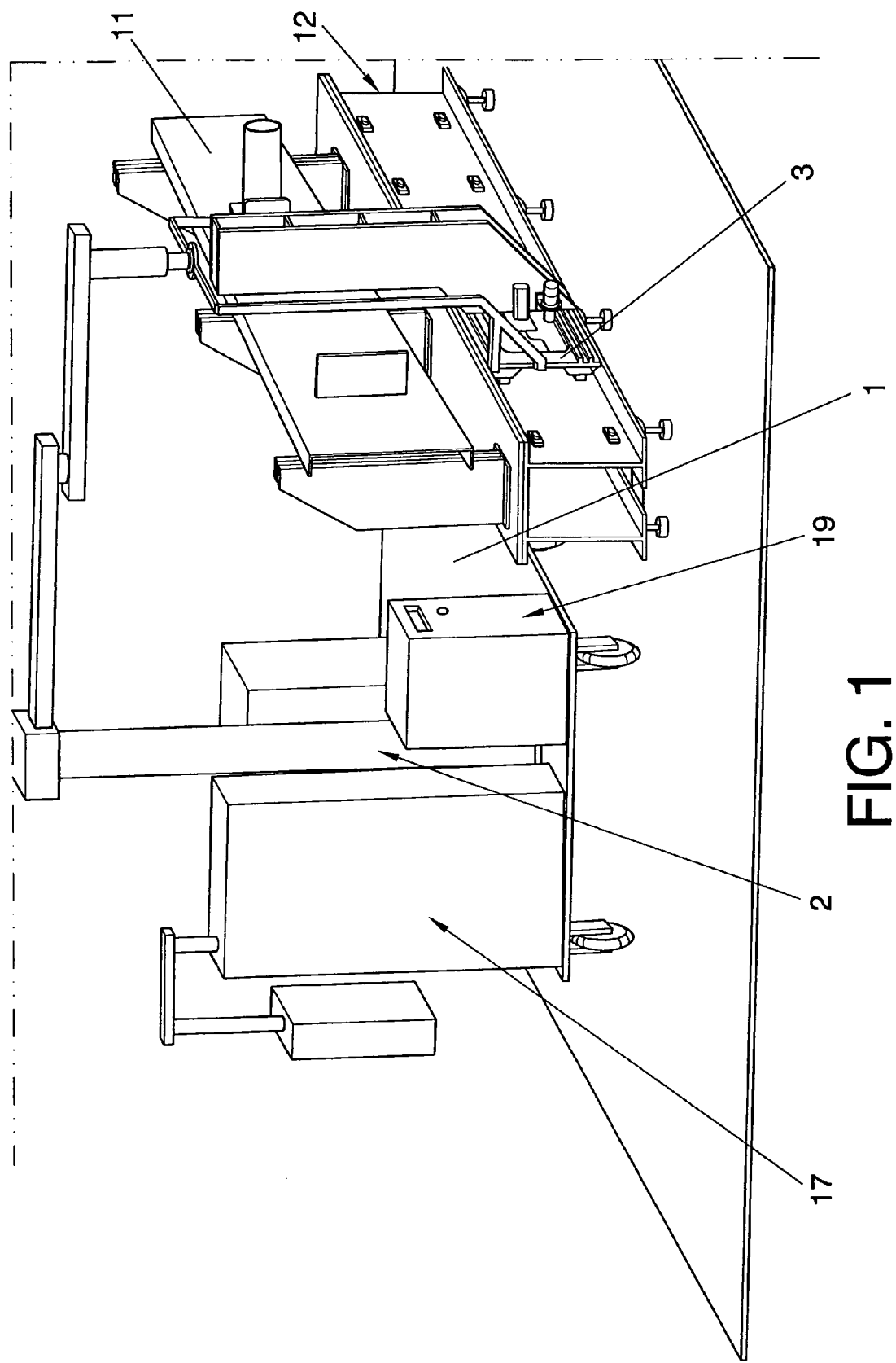
FIG. 1.—Shows a perspective view of a possible example of embodiment of the portable robot of the invention for its application in a stand of the simple tube type.
Figure 2:
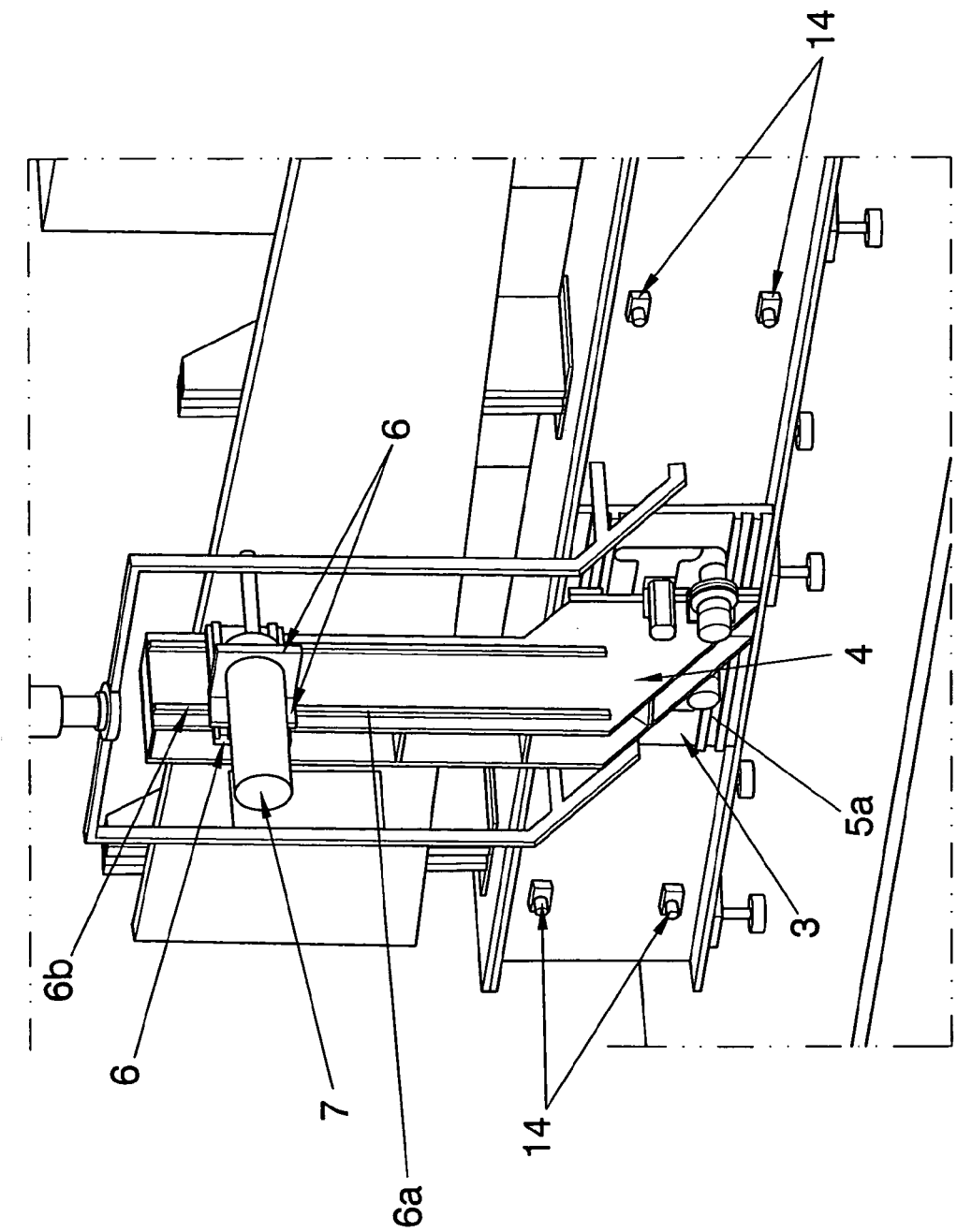
FIG. 2.—Shows a partial perspective view of the robot of the previous figure.
Figure 3:
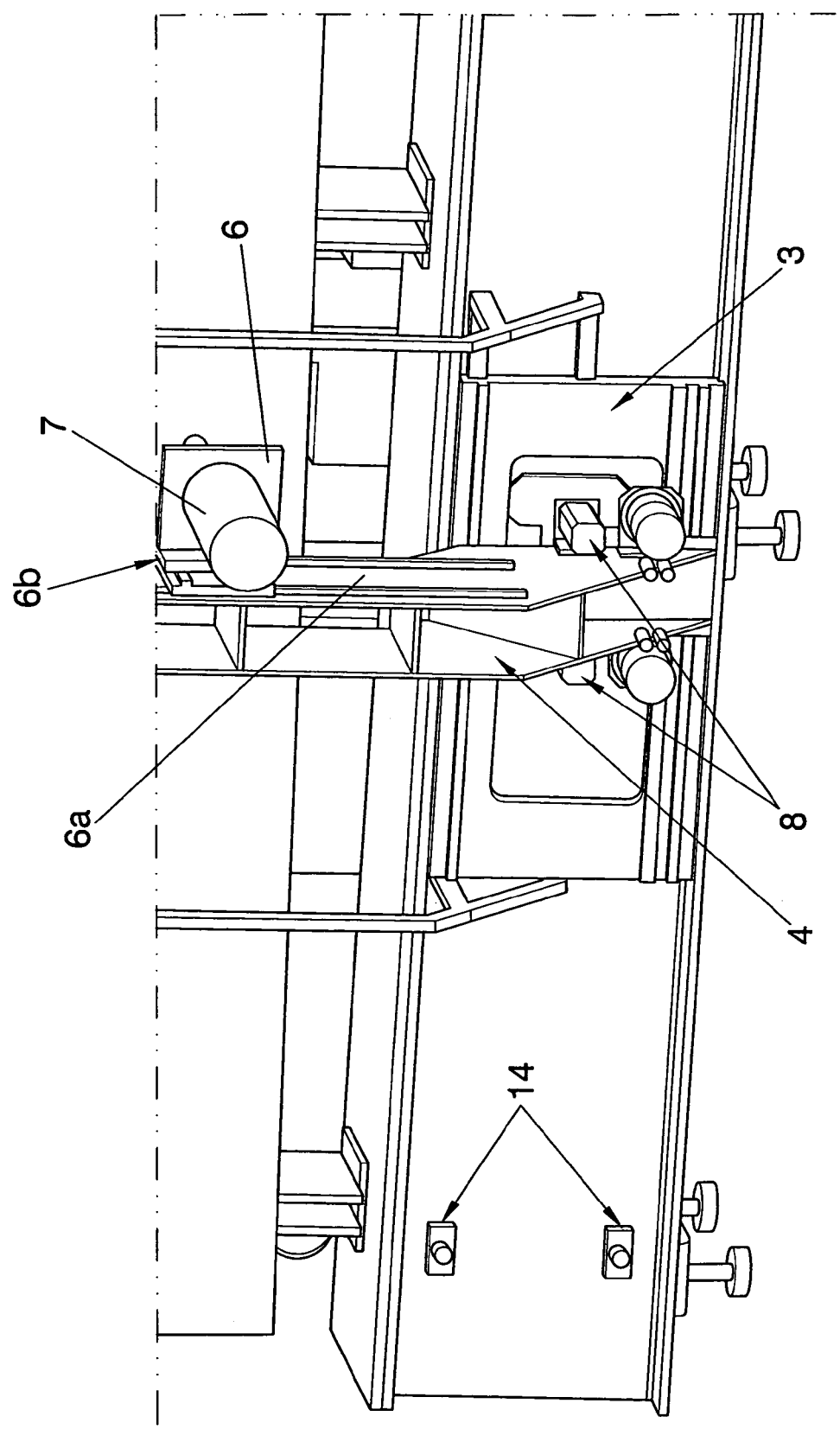
FIG. 3.—Shows a perspective view of a detail of the frame and beam.
Figure 4:
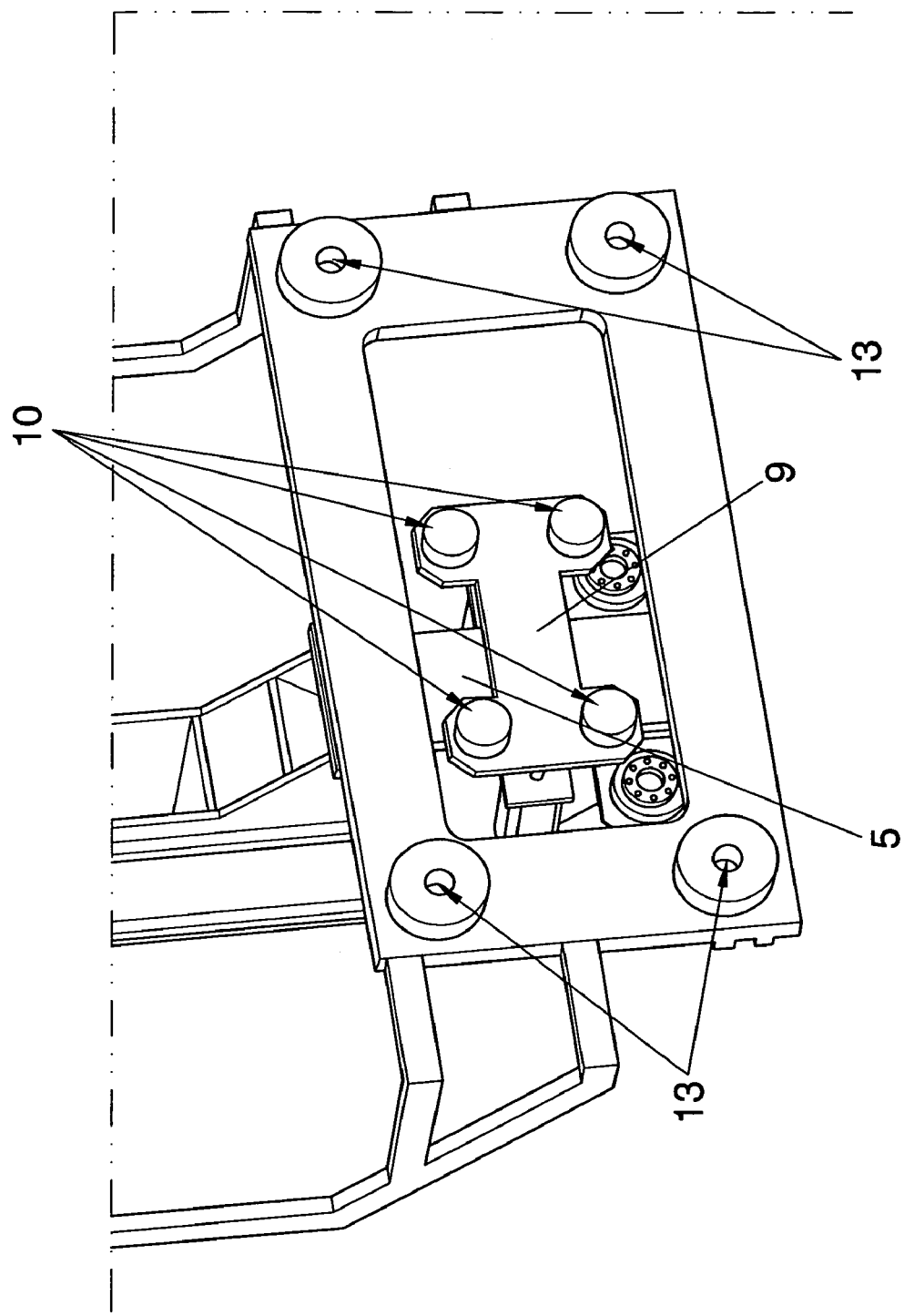
FIG. 4.—Shows a detail of the means of securing the frame and the beam to the stand.

Given below is a description of the invention based on the figures commented upon above.

The inventive robot is intended to carry out the drilling process during the assembly process of an aeronautical piece 11, such as a spar, for which the inventive robot comprises a displaceable platform 1 which permits the robot to move to the immediate vicinity of the stand 12.

The displaceable platform 1 includes an arm 2 with the possibility of ascending/descending displacement, supported at the end of which is a frame 3 whose lower end presents a configuration by way of a cradle on which rests a base 5 of a beam 4 on guides 5a, defining a longitudinal carriage by means of which the beam 4 can displace on the guides 5a.

Moreover, incorporated into the beam 4 is a cross-carriage 6 which supports a drilling head 7 in order to permit displacement of that head 7 in the Y and Z axes along the guides 6a, 6b. The head can also be displaced along the X axis by means of displacement of the beam 4 of the frame 3.

The beam 4 includes some pneumatic cylinders 8 fixed to each side thereof and which act on a plate 9 incorporating some electromagnetic suction pads 10.

On the frame 3, and more specifically in proximity to the edge of the cradle, provision has been made for some projecting nuts 13, and the stand 12 incorporates some bolts 14 which constitute means of securing for the frame 3 to the stand 12, as will be described further below.

On the basis of the description made, it is easily understood that, in order to carry out the drilling process using the robot of the invention, an operator leads the displaceable platform 1 to the immediate vicinity of the stand 12, in such a way that, making use of the arm 2 and locating the displaceable platform 1 in the proper place, he then positions the frame 3 in such a manner that its projecting nuts 13 face the bolts 14, in order to then introduce the bolts 14 into the projecting nuts 13, fastening them together by means of pneumatic energy.

Once the unit consisting of the frame 3 and the beam 4 has been secured to the stand 12, the functioning of the head 7 is then governed from a conventional numerical control which is included in an electrical cabinet 17 provided on the displaceable platform 1, in such a way that the displacement of the beam 4 on the frame 3 and the displacement of the cross-carriage 6 on the beam 4 are governed, the position of the head being controlled in the X, Y and Z axes in order to carry out the drilling according to the program included in the numerical control and with the established tolerance, since each of the drill-holes is made from a position known by the numerical control corresponding to the position of the bolts 14 in the stand 12.

Once the drilling head 7 has produced all the drill-holes governed from the numerical control, the latter causes the beam 4 to be displaced towards the advance end of the cradle of the frame 3, in which position the pneumatic cylinders 8 are actuated in order to displace the plate 9 until the electromagnetic suction pads 10 make contact with the surface of the stand 12. These suction pads are then activated in order to secure the beam 4 to the stand 12. At that moment, the fastening of the bolts 14 in the projecting nuts 13 is deactivated so that the former remain free, and the pneumatic cylinders continue to be activated until the frame 3 is at a sufficient distance with respect to the stand 12 in order to permit the projecting nuts 13 to move over the bolts 14 without colliding with them.

At that moment, the displacement motors for the X axis are activated and the frame 3 is displaced on the beam 4, due to the fact that the beam 4 is fixed to the stand 2 by means of the electromagnetic suction pads 10 and also because the frame 3 is not secured to the stand 12, thus producing its longitudinal displacement with respect to the beam 4. The frame 3 is displaced towards the advance end and the movement of the pneumatic cylinders 4 is activated in order to bring the frame close again to the stand 12 and fit the projecting nuts 13 around the bolts 14 corresponding to the following work zone. The array of housings/bolts is then fastened and the electromagnetic suction pads 10 are deactivated and withdrawn by means of the movement of the pneumatic cylinders 4.

In this way, the robot crawls on the stand 12 and is now ready to carry out drilling on a new work zone.

It can be emphasised that when the frame 3 is secured to the stand via the electromagnetic suction pads 10 provided in the beam 4, the arm 2 helps to maintain the securing the electromagnetic suction pads 10 on the surface of the stand 12, since these pads are not capable of supporting the vertical force on account of the weight of the entire unit, and the result would be a slippage taking place along the surface of the stand 12, which is avoided by means of the arm 2 which compensates for the weight of the unit formed by the frame 3 and the beam 4. The arm 2 permits loads to be handled in space gently and without any major stresses, and it also releases the weight in order to avoid deformations of the stand 12. This arrangement also avoids having to use the plant's gantry crane, which means that it can instead be used for other production operations carried out in the same plant. Moreover, the arm can be exploited as a safety element in the event of a power failure.

It can be pointed out that in the example of embodiment, the displaceable platform 1 is displaced by means of driven wheels.

The displaceable platform 1 also includes a suction system incorporated into the cabinet 15 which carries out the suction of swarf generated in the drilling and which is of the conventional type.

It also incorporates conventional elements corresponding to a cooler for the head 19 and a hydraulic unit 20 for carrying out the securing and change of tool for the head.

Figure 5:
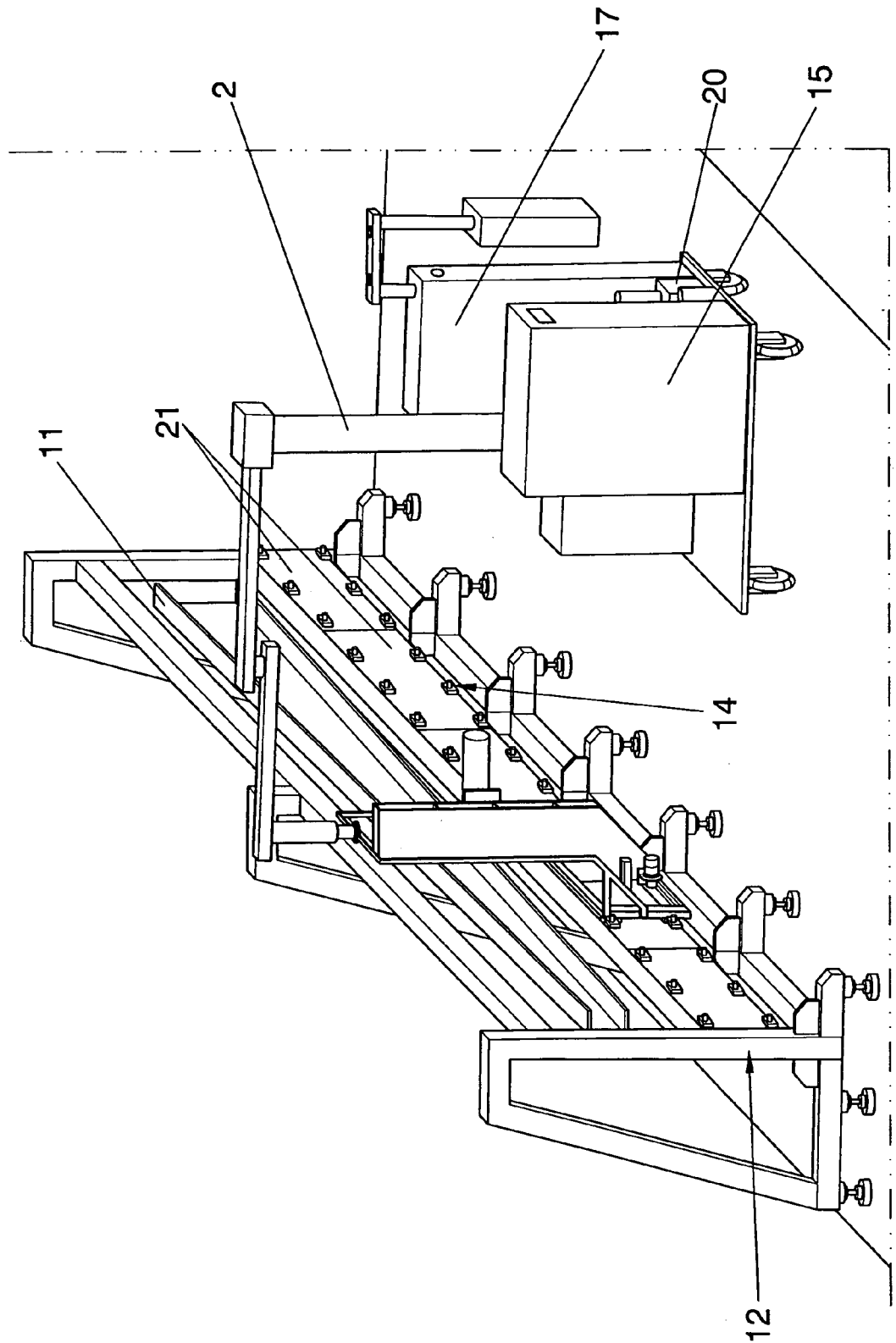
FIG. 5.—Shows a perspective view of the application of the inventive robot to a stand of the double tube architecture type.

FIG. 5 shows an application of the invention for the case in which the stand is the double tube type, in which a set of sheets 21 have been incorporated on the stand to which different bolts 14 have been added in order to permit the securing and advance of the robot along the stand 12 in the manner that was described earlier.

The invention claimed is:

1. PORTABLE ROBOT for carrying out a drilling process for the assembly of aeronautical components, for which the components are secured to a components supporting structure known as a stand (12);
   characterized in that the portable robot comprises a platform (1) that is movable in order to locate the platform close to the stand (12), and on which platform is included an arm (2) having a movable arm portion having a horizontal longitudinal axis, which arm portion is mounted so as to be displaceable relative to the platform and which arm supports a frame (3) which includes a beam (4) having a vertical longitudinal axis and on which beam (4) is supported a drilling head (7) mounted so as to be displaceable relative to the platform in three axes; with means for securing the frame (3) to the stand (12) in at least one selected position on said stand (12), from which at least one selected position the displacement of the drilling head (7) is governed in the three axes by means of a numerical control device within margins previously established in the numerical control device.

2. PORTABLE ROBOT, according to claim 1, characterized in that a series of securing positions are provided for the frame (3) on the stand (12); and in that means for crawling have been provided for the frame (3) and the beam (4) on the stand (12) in order to change the securing positions on the stand (12) and manufacture different drill-holes in each securing position.

3. PORTABLE ROBOT, according to claim 2, characterized in that the means for crawling comprise a base (5) for the beam (4) by means of which the beam (4) is secured to the frame (3) with the possibility of displacement in a longitudinal direction of the stand (12), the beam (4) comprising means for securing the beam (4) to the stand (12), which are deactivated in order to permit the longitudinal displacement (X axis) of the beam (4) with the drilling head (7) relative to the frame (3); which beam (4), after the producing of the drill-holes, is displaced to one end of the frame (3), the means for securing the beam (4) to the stand (12) being actuated in order to secure the beam (4) to the stand (12) and the means for securing the frame to the stand being deactivated so that the frame (3) can be displaced as far as a following securing position on the stand (12).

4. PORTABLE ROBOT, according to claim 3, characterized in that the means for securing the frame (3) to the stand consist of bolts (14) and projecting nuts (13) which are fastened by means of a servo-pneumatic circuit governed by a programmable logic controller.

5. PORTABLE ROBOT, according to claim 4, characterized in that the means for securing the beam (4) to the stand (12) comprise electromagnetic suction pads (10) actuated by pneumatic cylinders (8) which make it possible to separate the projecting nuts (13) with respect to the bolts (14), so that when the frame (3) is displaced on the stand, the bolts (14) do not collide with the frame (3).

6. PORTABLE ROBOT, according to claim 5, characterized in that the portable robot comprises a cross-carriage (6) which supports the drilling head (7) on the beam (4) in order to permit the displacement of the drilling head (7) on two of the three axes.

7. PORTABLE ROBOT, according to claim 2, characterized in that the arm (2) is displaceable in any direction in order to position portions of the means for securing the frame to the stand so as to face one another.

8. PORTABLE ROBOT, according to claim 2, characterized in that the movable platform comprises an electrical cabinet (17) which includes the numerical control device, and wherein the platform also includes a suction device (15) for the swarf generated during the drillings, a cooler (19) for the drilling head (7), and a hydraulic unit (20) for carrying out the change of a tool in the drilling head (7).

9. PORTABLE ROBOT, according to claim 3, characterized in that the arm (2) is displaceable in any direction in order to position portions of the means for securing the frame to the stand so as to face one another.

10. PORTABLE ROBOT, according to claim 3, characterized in that the movable platform comprises an electrical cabinet (17) which includes the numerical control device, and wherein the platform also includes a suction device (15) for the swarf generated during the drillings, a cooler (19) for the drilling head (7), and a hydraulic unit (20) for carrying out the change of a tool in the drilling head (7).

11. PORTABLE ROBOT, according to claim 4, characterized in that the arm (2) is displaceable in any direction in order to position the projecting nuts (13) facing the bolts (14).

12. PORTABLE ROBOT, according to claim 4, characterized in that the movable platform comprises an electrical cabinet (17) which includes the numerical control device, and wherein the platform also includes a suction device (15) for the swarf generated during the drillings, a cooler (19) for the drilling head (7), and a hydraulic unit (20) for carrying out the change of a tool in the drilling head (7).

13. PORTABLE ROBOT, according to claim 5, characterized in that the arm (2) is displaceable in any direction in order to position the projecting nuts (13) facing the bolts (14).

14. PORTABLE ROBOT, according to claim 5, characterized in that the movable platform comprises an electrical cabinet (17) which includes the numerical control device, and wherein the platform also includes a suction device (15) for the swarf generated during the drillings, a cooler (19) for the drilling head (7), and a hydraulic unit (20) for carrying out the change of a tool in the drilling head (7).

15. PORTABLE ROBOT, according to claim 6, characterized in that the arm (2) is displaceable in any direction in order to position the projecting nuts (13) facing the bolts (14).

16. PORTABLE ROBOT, according to claim 6, characterized in that the movable platform comprises an electrical cabinet (17) which includes the numerical control device, and wherein the platform also includes a suction device (15) for the swarf generated during the drillings, a cooler (19) for the drilling head (7), and a hydraulic unit (20) for carrying out the change of a tool in the drilling head (7).

17. PORTABLE ROBOT, according to claim 1, characterized in that the arm (2) is displaceable in any direction in order to position portions of the means for securing the frame to the stand so as to face one another.

18. PORTABLE ROBOT, according to claim 7, characterized in that the movable platform comprises an electrical cabinet (17) which includes the numerical control device, and wherein the platform also includes a suction device (15) for the swarf generated during the drillings, a cooler (19) for the drilling head (7), and a hydraulic unit (20) for carrying out the change of a tool in the drilling head (7).

19. PORTABLE ROBOT, according to claim 1, characterized in that the movable platform (1) is moved by means selected from between manual and automatic.

20. PORTABLE ROBOT, according to claim 8, characterized in that the movable platform comprises an electrical cabinet (17) which includes the numerical control device, and wherein the platform also includes a suction device (15) for the swarf generated during the drillings, a cooler (19) for the drilling head (7), and a hydraulic unit (20) for carrying out the change of a tool in the drilling head (7).

21. PORTABLE ROBOT, according to claim 1, characterized in that the movable platform comprises an electrical cabinet (17) which includes the numerical control device, and wherein the platform also includes a suction device (15) for the swarf generated during the drillings, a cooler (19) for the drilling head (7), and a hydraulic unit (20) for carrying out the change of a tool in the drilling head (7).

* * * * *